Dec. 1, 1970 D. W. TAYLOR 3,544,803

VEHICULAR ELECTRICAL SYSTEMS

Filed April 1, 1968 5 Sheets-Sheet 1

INVENTOR.
Douglas W. Taylor

BY Mueller, Aichele & Rauner

ATTY'S.

VEHICULAR ELECTRICAL SYSTEMS

Filed April 1, 1968 5 Sheets-Sheet 2

INVENTOR.
Douglas W. Taylor

BY Mueller, Aichele & Rauner

ATTY'S.

VEHICULAR ELECTRICAL SYSTEMS

Filed April 1, 1968 5 Sheets-Sheet 3

INVENTOR.
Douglas W. Taylor

BY
Mueller, Aichele & Rauner

ATTY'S.

INVENTOR.
Douglas W. Taylor

BY Mueller, Aichele & Rauner

ATTY'S.

VEHICULAR ELECTRICAL SYSTEMS

Filed April 1, 1968 5 Sheets-Sheet 5

INVENTOR.
Douglas W. Taylor

BY

Mueller, Aichele & Rauner

ATTY'S.

3,544,803

VEHICULAR ELECTRICAL SYSTEMS

Douglas W. Taylor, Phoenix, Ariz., assignor to Motorola, Inc., Franklin Park, Ill., a corporation of Illinois Filed Apr. 1, 1968, Ser. No. 717,826
Int. Cl. H04q 3/02
U.S. Cl. 307—10 38 Claims

ABSTRACT OF THE DISCLOSURE

A power distribution line and a signal distribution line are disposed throughout a vehicle and connected to control and function performing stations. A master sequencer emits signals over the signal line for sequentially addressing sets of stations, each set of stations having one station emitting a control or indicating signal to a corresponding function performing station. Control and indicating signals are transferred over the signal line intermediate successively occurring address signals. Pulsating power is supplied over the power line and is used to synchronize the station addressing. DC power is distributed over a third line. Stations may have a memory capability.

BACKGROUND OF THE INVENTION

This invention relates to vehicular electrical systems, particularly those adapted to be utilized in automotive vehicles.

Automotive electrical systems in the past have required extensive wiring harnesses. Each different model of a plurality of models of a given automobile line usually has required a different wiring harness. In vehicle assembly lines, the production control system must match each wiring harness with the particular model or set of models being assembled. This requirement causes additional costs in the vehicle due to the required stocking of various wiring harnesses and programming the production to ensure that the correct wiring harness is matched to the particular model of vehicle being assembled. It is desired to provide an electrical system for an automobile having increased versatility and which reduces or eliminates the harness inventory problem.

SUMMARY OF THE INVENTION

It is the object of this invention to provide a vehicular electrical system which is not limited to a particular design of a wiring harness.

It is another object of this invention to provide a vehicular electrical system having a minimum number of wires as a wiring harness.

It is a further object of the present invention to provide a vehicular electrical system using an addressing scheme for effecting actuation of electrical devices within the vehicle.

A feature of the present invention includes the provision of a signal distribution line and a coextensive power distribution line in a vehicle together with addressing and address responsive means which selectively distribute power to various stations within the vehicle and simultaneously effect the exchange of control and indicating signals between stations.

Another feature is the provision of a master sequencer actuated by a power distribution system in accordance with the pulsating frequency thereof.

Yet another feature is an addressing scheme having a succession of address signals of different amplitudes, one of which has a unique characteristic serving as a fiducial signal.

A further feature is the provision of impedance detection means connected to the signal line for detecting the quality of performance of a selected station.

Another feature is a completely digitally controlled vehicular electrical distribution and control system.

In one embodiment of the present invention, a periodic voltage generator, such as a voltage inverter, supplies pulsating power over a power distribution line to various portions of a vehicle. Rectangular wave pulsating power also may be supplied by an electrical responsive switch driven by an alternator or such pulsating power may be a sine wave. A signal distribution line is disposed throughout the vehicle substantially coextensively with the power distribution line. A master sequencer repetitively supplies a fiducial signal for resetting the system to a reference state. A plurality of stations, which may include function-performing devices, phenomena sensing stations, control signal emitting stations and the like are connected to both the power distribution and signal distribution lines. Each station has an address signal responsive means which selectively connects the station to the power line for receiving pulsating power. In the time period immediately following the address signal, control stations selectively emit control or indicating signals over the signal line to a function-performing station for actuating a device, such as a head lamp. Each control station and corresponding function-performing station constitutes a set of stations assigned one unique address signal and a period of time subsequent to that address signal for exchanging control and indicating signals. Such signals may indicate status of a load, a condition within the vehicle, a selected function to be performed, or the like. Since one function, such as lighting head and tail lamps, is performed in different portions of the vehicle, one station has several portions adjacent each device which is to perform a portion of the desired function. Different function-performing stations perform independent functions. Portions of two different independent functions may be identical, i.e., tail lights are lit when both driving and parking lamps are lit.

In accordance with another embodiment, the master sequencer supplies time sequential address signals with differing amplitudes to the signal distribution line. The address responsive means in the respective stations are operative to exchange information and control signals in time intervals intermediate successively occurring address signals, each station remaining activated for a period of time equal to such time interval.

Each of the function-performing stations and control stations may have storage means for providing continuous functions between successively received address and control signals.

A station status indicator is provided by an electroresponsive variable impedance connected to the signal distribution line. When a station is in a first operative condition first impedance magnitude is reflected to the signal line which is then detected by an impedance detector, remotely located in the vehicle. When the operative condition changes, the variable impedance is responsive to such change to alter its impedance and thereby indicate such changed status to the signal line. In this manner malfunctions or misfunctions are indicated to the vehicle operator. Indicating and control signals are exchanged over the signal line simultaneously with such impedance indications.

Each address responsive means may be an open-ended ring counter responsive to pulsating power. Such counter is operative to actuate a function detector upon reaching a predetermined count of pulsating power cycles.

The vehicular devices actuated by the system according to this invention may be powered by the pulsating power used to synchronize system operation; a combination of battery power and such pulsating power or such battery power may be selectively supplied to such devices by gating means actuated by such pulsating power.

THE DRAWINGS

DESCRIPTION OF THE ILLUSTRATIVE EMBODIMENTS

Figure 1:
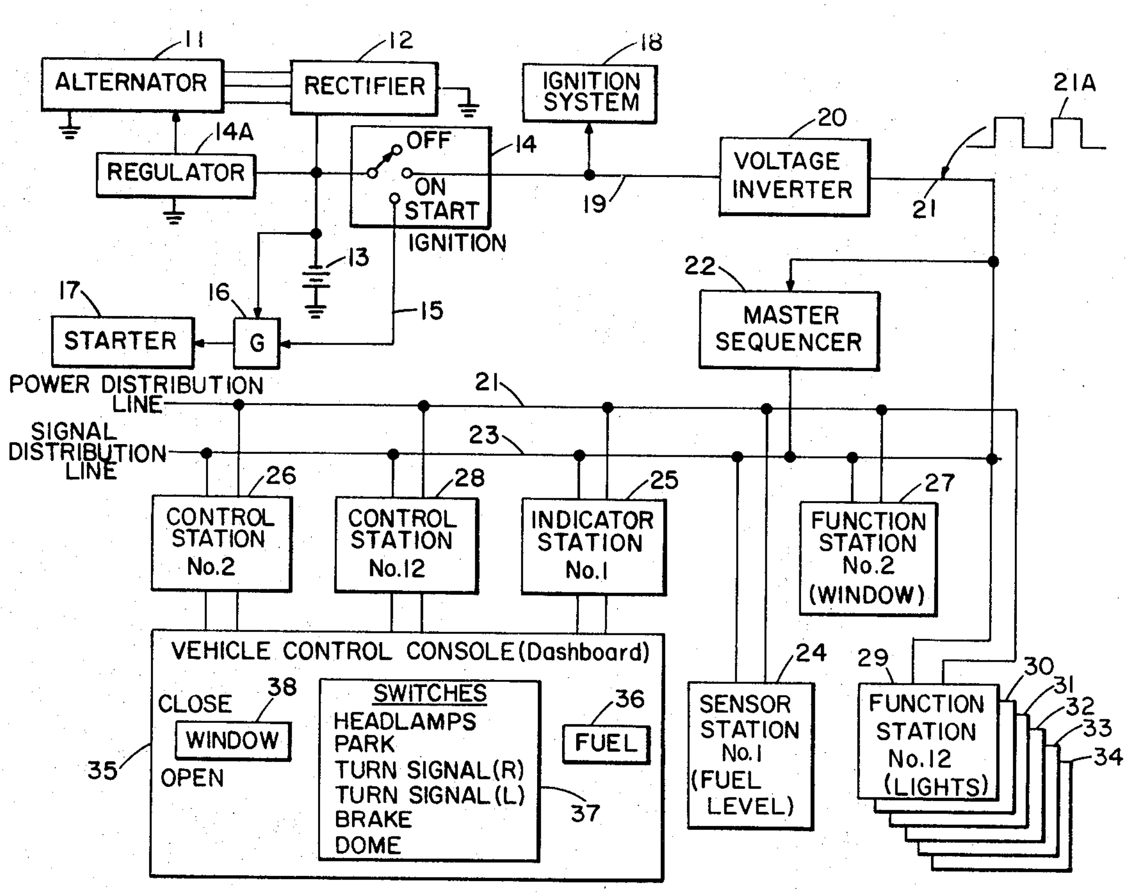
FIG. 1 is a block diagram of a vehicular electrical system incorporating the teachings of the present invention.
Figure 2:
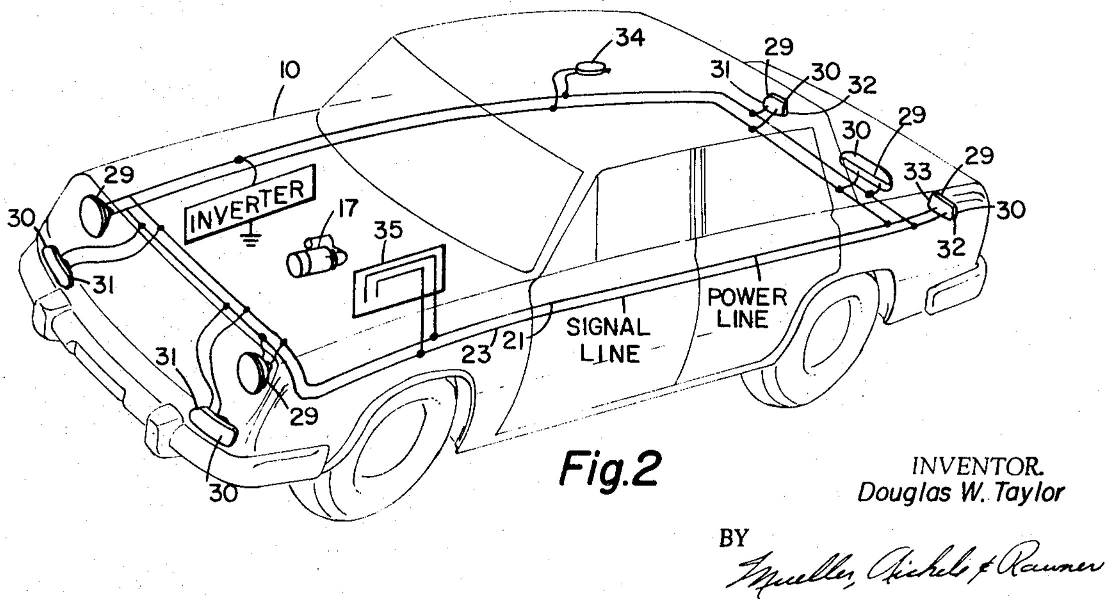
FIG. 2 is a diagrammatic showing of a vehicle incorporating the FIG. 1 system.
Figure 1A:
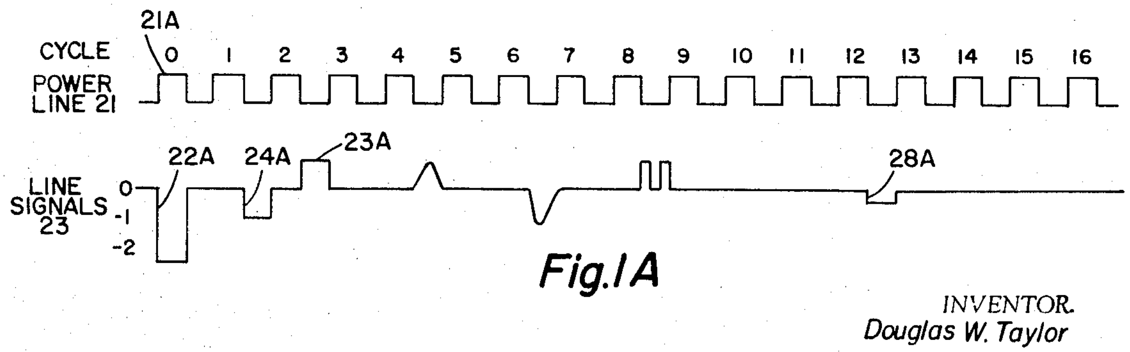
FIG. 1A illustrates idealized signal waveforms usable for addressing and sequencing the FIG. 1 system.

In referring to the drawings, like numbers indicate like parts and structural features in the various figures. Referring first to FIGS. 1, 1A and 2, numeral 10 denotes an automotive vehicle in diagrammatic form which incorporates the present invention. Vehicle 10 has alternator 11 supplying three-phase alternating current to rectifier 12. Rectified DC power is supplied to charge battery 13 and to regulator 14A for controlling the operation of alternator 11 in a known manner. DC power is supplied through the start position of ignition switch 14 over line 15 to gate 16 for energizing starter 17. Gate 16 may be a relay of known design. Ignition switch 14 also supplies DC power to ignition system 18 and over line 19 to voltage inverter 20, which may be a transistorized square-wave generator. A 400-cycle square wave 21A is supplied as pulsating power over power distribution line 21 to master sequencer 22 which sequences the operation of the electrical system in the vehicle. Sequencer 22 repetitively supplies address signal sets which may consist of a single fiducial signal emitted over signal distribution line 23 to a plurality of vehicular electrical stations 24 through 34, inclusive. The pulsating power on line 21 is used in conjunction with the fiducial signal to address the system. Each station has a connection to the power distribution line 21 and as an address indication counts a predetermined number of power pulsations after each fiducial signal. Each station upon counting such predetermined number of pulsations opens a gate for connecting signal distribution line 23 to the station. In a later described embodiment, sequencer 22 supplies all address signals over signal distribution line 23, such address signals being derived from the power pulsations. Such addressing selects one power cycle for exchange of control and indicating signals between two or more stations. In the described embodiments, the positive half cycles of wave 21A are used to address or select stations to be connected to signal line 23 while in each immediately following negative one-half cycle control indicating and other signals are exchanged between the addressed or selected stations.

The term pulsating power includes not only the illustrated rectangular waves but also pulses and alternating current power.

Sensor station 24 measures fuel level and supplies its fuel level indicating signal 24A (FIG. 1A) over signal line 23 to indicator station 25 which controls fuel gauge 36 in vehicular control console 35. Control station 26 is actuated by window control units 38 on console 35 to supply control signal 23A over line 23 to function station 27, which is operative to open and close a window (not shown). In a similar manner, control station 28 is responsive to a plurality of switches 37 in console 35 to supply any one of a plurality of control signals over line 23 to a plurality of function stations 29 through 34 inclusive, which operate the various lights in the vehicle. For example, station 29 may operate the head lamps requiring a station portion at each of the forward head lamps, the tail lights, and the license plate lamp, as best seen in FIG. 2. Stations 30 through 34 perform similar functions for other lighting operations in vehicle 10. The function performing stations have a memory capacity such that the lights, for example, when energized, emit a constant light. Diagrammatically illustrated lighing system control 37 lists some lighting control functions respectively performed by function performing stations 29 through 34. Further examples of functions performable or actuated by a system using the present invention are not described for purposes of more clearly pointing out the invention.

The illustrative embodiments show a single level control for each function to be performed. Multilevel control stations can be provided to reduce the addressing circuits at the function performing stations. For example, the function of lighting driving lights and parking lights in the illustrated embodiment requires address detection circuits for both functions at both tail lights, i.e., four address detector circuits. By reconstructing the control signal emitting stations to individually control the tail lights from the head or driving lamps, only two address detecting circuits are required—one for each tail lamp. In this latter arrangement, separate control stations are provided for the head and tail lamps with the tail lamp control station being actuated to emit control signals whenever the vehicle operator selected to turn on either the driving or parking lamps.

Referring to FIG. 2, each electrical device location of an automotive vehicle may have plural function performing stations, while each function station in turn has a station portion at a plurality of locations. For example, function performing station 29 which turns on the head lamps has a station portion at each of the four head lamps, both tail lamps and the license plate lamp. The right rear tail light location has portions of four function stations 29, 30, 31 and 33. When the head lamps are turned on, the right rear tail light is turned on by function station 29; when the parking lights are turned on, station 30 is actuated to turn the right rear tail light on; when the right turn signal is actuated, station 31 is operative to flash right rear tail light on and off; while when the brakes are depressed, station 33 lights the brake light portion of the right rear tail light. Other function performing stations are indicated as having portions at various locations throughout the vehicle. Such portions may simultaneously or sequentially perform functions indicated by control signals on line 23.

Figure 3:
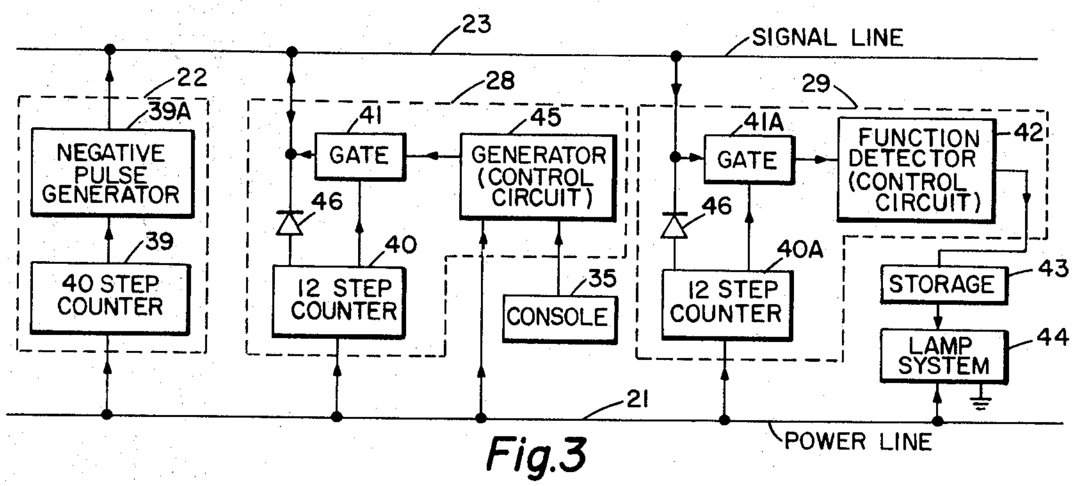
FIG. 3 is a block diagram of a portion of the FIG. 1 system illustrating a master sequencer and various stations of the system.

Turning now to FIG. 3, master sequencer 22 receives 400-cycle square wave 21A (FIG. 1A) from line 21 to repetitively cycle 40-step or 40-state counter 39. One of the 40 states is a reference or fiducial state. When the fiducial state is reached, counter 39 actuates negative pulse generator 39A, which may be a monostable multivibrator, to emit a negative pulse 22A over line 23 which resets all station address counters to a reference state. This negative pulse is termed a "fiducial pulse," Address counters in the various stations are stepped by the 400-cycle square wave supplied over power distribution line 21 to their respective predetermined counts for address detection, as will be explained. Alternatively, counter 39 may supply a series of positive pulses over line 23 to the various station counters for stepping the address counters.

Twelve-step counter 40 in station 28 counts the first twelve positive one-half cycles of 400-cycle square wave 21A after each fiducial pulse 22A. Counter 40 may be of usual design such that it increments (or decrements) one count for each square wave received. Upon completing 12 steps, counter 40 supplies a gate opening or enabling signal to gate 41. Gate 41 completes a signal path from function generator 45 to signal line 23. Function generator 45 receives pulsating power from line 21 and continuously supplies a control signal to gate 41 as manually selected in vehicular control console 35 (FIG. 1). Function performing station 29 includes an identical 12-step counter 40A and gate 41A which is opened simultaneously with gate 41. Therefore, the signals from generator 45 supplied over line 23 are passed into station 29 thence to function detector 42. Function detector 42 is responsive to the control signal to indicate the desired function to storage means 43 which in turn supplies the indication to lamp device 44. Storage means 43 may include flip-flops, monostable multivibrators, capacitors or the like. Lamp device 44 receives pulsating power from line 21 for energizing a high beam, low beam, or turn lights off in response to the signal in storage means 43. Alternately, DC power from battery 13 (FIG. 1) may be used to power lamp system 44. For example, the pulsating power on line 21 may be used to energize a relay for passing DC power to the lamp device.

Control station 26 operates with function station 27 in a similar manner. The various function stations 29 through 34, inclusive, are selectively responsive to control signals from generator 45 depending upon the function desired as selected in console 35. Diodes 46 in function stations 28 and 29 provide a unidirectional current conductive path for the fiducial signal for resetting counters 40 and 40A to a reference state. Diodes 46 are biased to conduct only when a signal on line 23 has a negative magnitude greater than the —2 threshold (FIG. 1A); —2 indicating twice the magnitude of line 23 signals used for other purposes. Such threshold permits negative control signals 28A and 24A to be transferred over signal line 23. The negative magnitude and energy threshold of counters 40 are set to ensure reliable operation in the presence of transients that may be induced in signal line 23.

Master sequencer 22 includes 40-step counter 39 generating 40 discrete addresses. Each address usually affects at least two stations, one station emitting a control or indicating signal to line 23, and one or more second function performing stations selectively receiving such control or indicating signal from line 23 for performing a function called for by the received signal. A plurality of functions and indications can be supplied through a single control station to a plurality of function performing stations, it being understood that any degree of combinations may be provided. When using a 400-cycle square wave 22 as the power supply in the vehicle, a 40-step counter yields a function repetitive frequency of 10 cycles per second for each function to be performed. For most purposes such a function repetition rate ensures an adequate signaling frequency such that the function can be performed by the vehicle almost simultaneously with its manual selection. Each function performing station may require a memory capability to maintain a continuous function performance. Such memory capability may consist of an electronic signal storage, inertia in the device energized, a mechanical latch, or the like.

Figure 4:
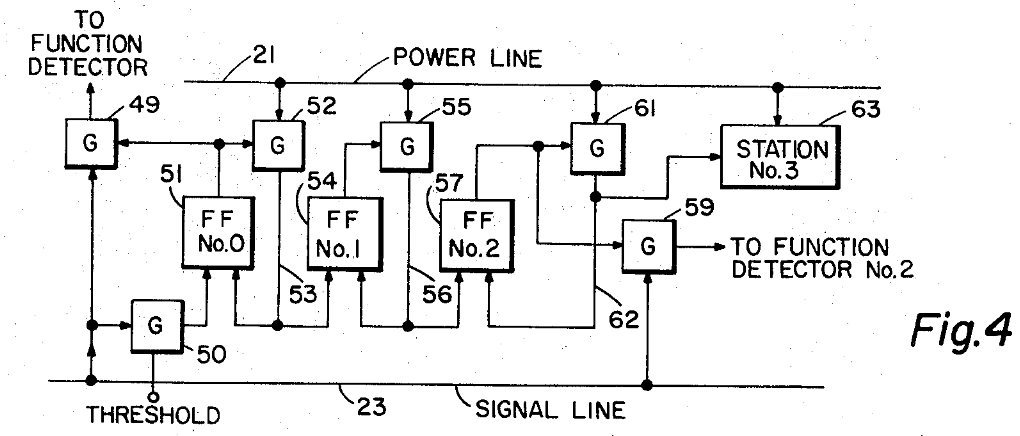
FIG. 4 is a block diagram of an open-end ring-type address counter usable with the FIG. 1 system.

Referring next to FIG. 4 there is shown a typical address counter, such as counter 40, with three flip-flops for counting two square wave cycles to make an address selection at the end of the second square wave cycle. The fiducial pulse 22A from generator 39A is supplied over signal line 23 through gate 50, which may consist of a diode 46 (FIG. 3), to set flip-flop 51 which represents the zero pulse position of the address counter. Gate 50 is biased to only pass signals having a negative magnitude greater than —2. Flip-flop 51 enables or opens gate 52 such that the negative-going trailing edge next occurring positive half cycle of square wave 21A on line 21 is supplied over line 53 as a short pulse to reset flip-flop 51 and set flip-flop 54, representing that the first cycle of the 40-cycle count is occurring. Gate 52 has a differentiator (not shown) responsive to negative transients to emit a pulse. When set, flip-flop 54 enables or opens gate 55 to pass the second occurring negative-going trailing edge of a positive half-cycle over lines 56 to reset flip-flop 54 and to set flip-flop 57. Flip-flop 57 supplies its enabling signal over line 58 to open gate 59 which supplies any control signals received from line 23 over line 60 to function detector 42 of FIG. 3. Gate 59 is constructed in the same manner as gate 99 of control station 26 (FIG. 5), later described.

When two function stations are adjacently located in the vehicle, such as the plurality of portions of function stations at each of the tail lights, the address counters may be combined such that the plurality of station portions may share a single counter. To this end, gate 61 (FIG. 4) passes the third occurring positive half cycle of square wave from line 21 to line 62 for resetting flip-flop 57 and to station address counter 63 which performs a function during each third occurring ring square wave power pulsation after a fiducial signal. Counter 63 may consist of a single flip-flop and a gate controlled thereby. It is understood that such combination counters for a plurality of functions may be connected in any desired manner. Gate 49, opened or enabled by flip-flop 51, passes control signals from line 23 occurring during the negative one-half cycle following the fiducial signal to function detector (not shown). Indicators may be provided on the vehicular control console to indicate that a function is being performed as well as quality of performance. Such an indication requires an additional portion of a function-performing station in the console for each function to be so indicated.

Referring back now to FIG. 1, sensor station 24 includes a signal generator (not shown) supplying a signal indicative of fuel level. The fuel level indicating signal is supplied over signal line 23 to indicator station 25 which in turn actuates fuel level indicator 36 in console 35. The first power pulsation in the succession of 40 cycles of wave 21A is used to sense and indicate the fuel level. The second power cycle is utilized to control window operation by manual switch 38 effecting control over a generator (not shown) which emits control signals through station 26 over line 23 to function station 27.

Figures 5, 6:
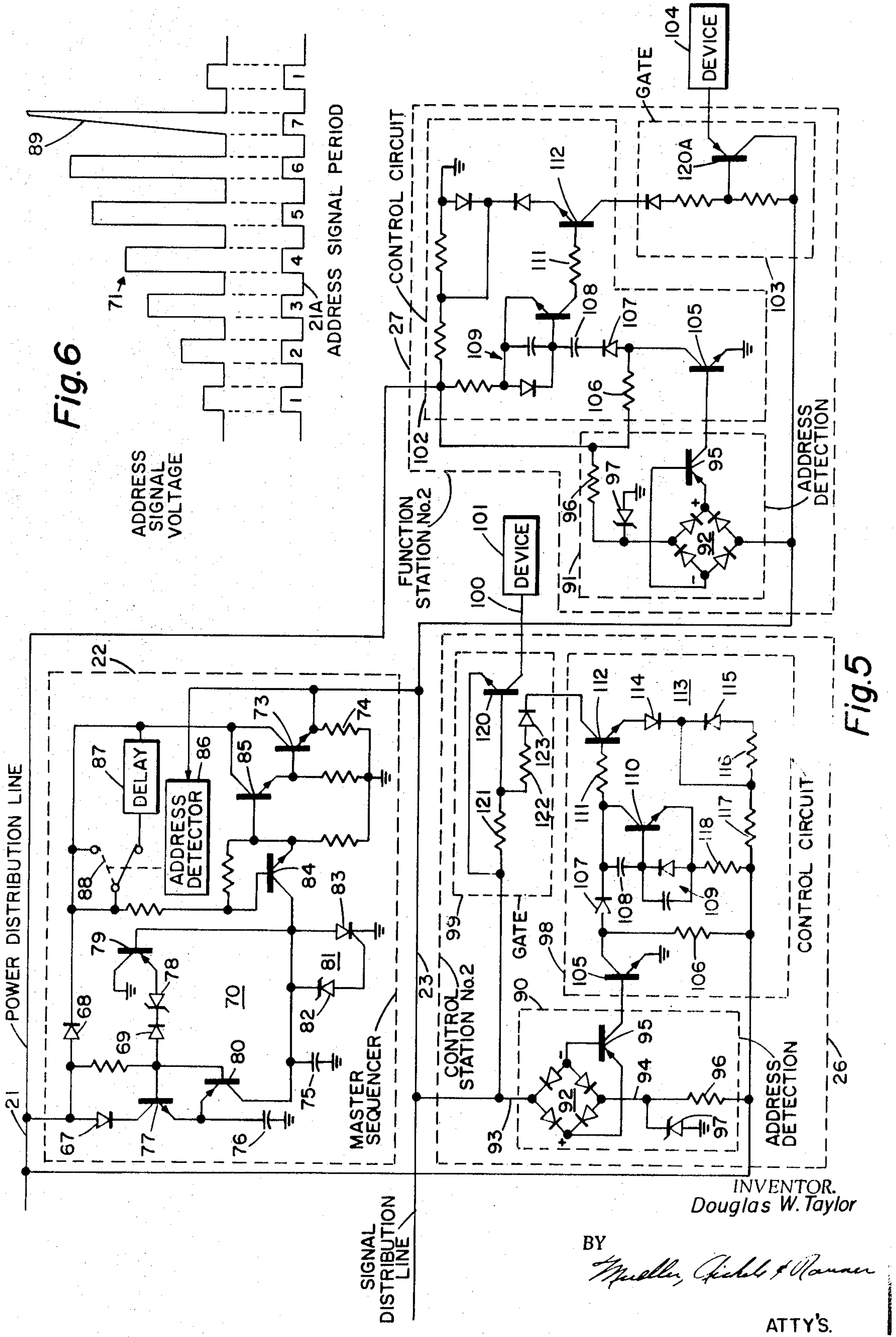
FIG. 5 is a schematic diagram showing one circuit implementation of the FIG. 1 system.
FIG. 6 is a chart showing idealized waveforms associated with the FIG. 5 system.

Referring next to FIGS. 5 and 6 there is shown an embodiment of the present invention into which there are combined analog and digital addressing techniques for use in the FIG. 1 system. Also disclosed are techniques for transferring control signals over line 23 in FIG. 1. Instead of a 40-step counter, there is provided a set of 7 successive address signals 71 forming one address cycle. The address sets are repeated at a frequency of about 57 Hz. The first address signal has a positive potential of about 3 volts; the second address signal has a positive potential of about 6 volts and each succeeding address signal has an increased DC potential of about 3 volts. Intermediate each of the successively occurring address signals, there is provided a time interval in which control signals may be exchanged over signal line 23 between the various stations in the vehicle. Each address signal 71, numbered from to seven, corresponds in time to the positive-going half cycle of the 400-cycle square wave 21A, while the time interval for control signal transfer corresponds to the negative one-half cycle of such square wave. The master sequencer 22 in FIG. 5 includes staircase generator 70 operative to supply address signals 71 through output transistor 73 which has the emitter-follower resistor 74 connected to signal distribution line 23. The potential of the various successive address signals are generated by repetitively charging large capacitor 75 from smaller capacitor 76. In one construction, capacitor 75 had a capacitance of 1.0 microfarads, while capacitor 76 had a capacitance of 0.25 microfarads. Arrangement of staircase generator 70 is such that the voltage-to-ground potential on capacitor 76 is always 15 volts greater than the voltage across capacitor 75, irrespective of the present voltage across or stored charge of capacitor 75. Because of the difference of capacitances between the two capacitors, the resultant voltage increment on capacitor 75 turned out to be 3 volts. In generating the staircase wave forms 71, the positive half cycle of square wave 21A supplied over line 21 charges capacitor 76 through transistor 77 to 15 volts with respect to the voltage across capacitor 75. Capacitor 75 is connected to the base electrode of transistor 79 while the emitter electrode of transistor 79 is in turn connected to 15 volt Zener diode 78 which determines the base voltage of transistor 77. The voltage across capacitor 75 is supplied by emitter follower action of transistor 79 to the anode electrode of Zener diode 78. Emitter-follower-connected transistor 80 limits the voltage across capacitor 76 to the 15 volts of Zener diode 78. Upon completion of the positive half cycle of square wave 21A, the negative cycle reverse biases diodes 67, 68 and 69. These diodes isolate line 21 from master sequencer 22 during the negative half cycle of square wave 21A.

The voltage across capacitor 75 is supplied to signal distribution line 23 through emitter-follower amplifier 84, thence to output transistors 73 and 85. The positive one-half cycle of square wave 21A is supplied from line 21 through diode 68, thence to output transistors 73 and 85 as a pulsed-collector supply voltage for creating the address signal in accordance with the voltage amplitude on capacitor 75. During the negative half cycle, transistors 73 and 85 supply "no signal" to line 23; line 23 being either at a reference potential or at the potential of a control or indicating signal being exchanged between control station 26 and function station 27, for example.

Upon completion of the seventh occurring address signal 71, address signal resetting circuit 81 completely discharges capacitor 75 to a reference potential. Circuit 81, including Zener diode 82 which may have a Zener voltage of about 60 volts, is connected to the voltage end of capacitor 75 and to the gate electrode of silicon controlled rectifier (SCR) 83. When the 60 volts is exceeded, diode 82 conducts to fire SCR 83. Upon conduction, SCR 83 completely discharges capacitor 75, resetting the master sequencer 22 which then repeats the above-described operation to repetitively supply sets of seven address signals.

As seen in FIG. 6, the seventh address has a sloping leading edge 89, his sloping leading edge is used as a fiducial signal. The sloped leading edge is useful for indicating to detector circuits (not shown) that the seventh address pulse is occurring without requiring the later described bridge-type address detector. Such information is useful for power level control effected by known circuits which select *m* of *n* square wave cycles to vary power input to a load. In the illustrated embodiment, $n=7$ while *m* is any number from 0 to 7. The sloped leading edge is generated in master sequencer 22. Address detector 86 receives address signals 71 from line 23 and every sixth address pulse moves switch 88 to the illustrated position for electrically connecting delay circuit 87 into the amplifier including transistor 84. Delay circuit 87 may be an inductance for preventing the build-up voltage on the base electrode of transistor 85 such as to form sloped leading wave front 89. Switch 88, of course, may be electronic. Address detector 86 is constructed as the later described detectors 90 and 91. Upon receipt of the sixth address pulse 71, a flip-flop (not shown) is set to set switch 88 to the illustrate position. Upon receipt of the seventh address pulse 71, a second detector circuit in detector 86 resets a flip-flop (not shown) returning switch 88 to the other position.

A staircase generator 70 is used to selectively provide control signals of various amplitude over line 23 in the time intervals provided therefor. An adaptation of generator 70 to such a use is later described with respect to FIGS. 11 and 12.

Referring again to FIG. 5, address detection and subsequent operation in control station 26 is described. It is to be understood that this operation is exemplary and can be used to effect operation of stations 24 and 28 as well. In order to facilitate discussion, it should be noted that function performing station, which is responsive to the same address as control station 26, has an identical circuit setup. To simplify matters, the corresponding electrical component parts of the two circuits have been identified with the same numbers.

Referring first to control station 26, address signals 71 from line 23 are supplied over line 93 to bridge circuit 92 in address detection means 90. Square wave 21A is supplied over line 21 through resistor 96 to line 94 connected to bridge circuit 92. It is recognized that bridge circuit 92 is a full-wave rectified and if there is any voltage difference between lines 93 and 94 a potential is provided across the bridge as indicated by the positive and negative signs while zero potential difference is supplied when lines 93 and 94 have identical voltages thereon. Transistor 95 has base and emitter electrodes connected across bridge circuit 92 as shown, such that whenever a voltage difference is detected between lines 93 and 94, transistor 95 is highly conductive. Only when the lines 93 and 94 voltages are identical and zero voltage is supplied across the base-to-emitter electrode does transistor 95 become nonconductive, i.e., in a high impedance state. This high impedance state indicates address detection.

It will be remembered that the address signal 71 staircase waveform is supplied to line 93. Square wave 72 develops a voltage across resistor 96. Such voltage is limited to a predetermined magnitude by Zener diode 97. Zener diode 97 is selected to match one and only one of the amplitudes of the successive staircase magnitudes of address signal 71. In control station 26. Zener diode 97 reverse breakover voltage is matched to the amplitude of the pulse appearing during time period 2 of FIG. 6.

Control circuit 98 is responsive to the high impedance state of transistor 95 to open gate 99 for providing an electrical circuit between line 23 and line 100 which is connected to device 101. Device 101 in this illustration may be window control switch 38 (FIG. 1) which is operative to provide a positive signal for closing a selected window and a negative signal for opening such window and ground reference potential for no action.

Control circuit 98 includes transistor 105 which is conductive at all times except when transistor 95 is in a high impedance state. Transistor 105 serves to provide ground reference potential to the junction of resistor 106 and diode 107. Square wave 21A is supplied through resistor 106 to such junction. When transistor 105 is in a high impedance state, the positive going half cycle of square wave 21 is supplied through diode 107 and capacitor 108 to the base circuit 109 of transistor 110. The collector of transistor 110 is connected through resistor 111 to gate control transistor 112. The emitter of gate control transistor 112 is connected to a resistor-diode network 113 thence to power distribution line 21. During the positive half cycle of square wave 21A, diode 114 is nonconductive thereby blocking the current path to transistor 112, and keeping gate 99 closed or blocked as will be explained. During the negative half cycle of square wave 21A, diode 115 limits the negative excursion to ground reference potential. Negative half cycle of square wave 21A is supplied through resistor 118 to base circuit 109. When a positive signal had been supplied to capacitor 108 in the previous positive one half cycle of square wave 21A, the capacitor across the diode of circuit 109 causes transistor 110 to become current conductive thereby causing transistor 112 to become conductive. At other times transistor 112 is nonconductive.

When transistor 112 is nonconductive, diode 123 is blocked and provides no current path for current flowing from line 23 or from the base electrode of NPN transistor 120. However, when transistor 112 is in a conductive state, current flows through resistors 121, 122 providing a negative bias to the base electrode of NPN transistor 120 causing base current to flow maintaining its conductivity. By selecting the type of transistor 120, i.e., NPN or PNP, signal flow can be in either direction, i.e., from device 101 or to device 101 respectively. By selecting a bilateral transistor, signal flow may be in either direction.

Function station 27 includes address detection circuit 91, identical to circuit 90 of station 26; and control circuit 102, identical to the control circuit 98 of station 26. Gate 103 is identical to gate 99 except that transistor 120A is PNP rather than NPN and is opened or enabled by a negative rather than a positive signal on its base electrode. Device 104 is connected to the emitter electrode of transistor 120A. Control signals generated by device 101 (station 26) are supplied during the second occurring negative-half-cycle of square wave 21A over line 100 to transistor 120, and thence line 23 and transistor 120A to device 104. Device 104 may be a signal responsive device for selectively actuating movement of a window. The design of device 104 is not pertinent to an understanding of the present invention and will not be described herein, such devices being known in the art.

Figure 7:
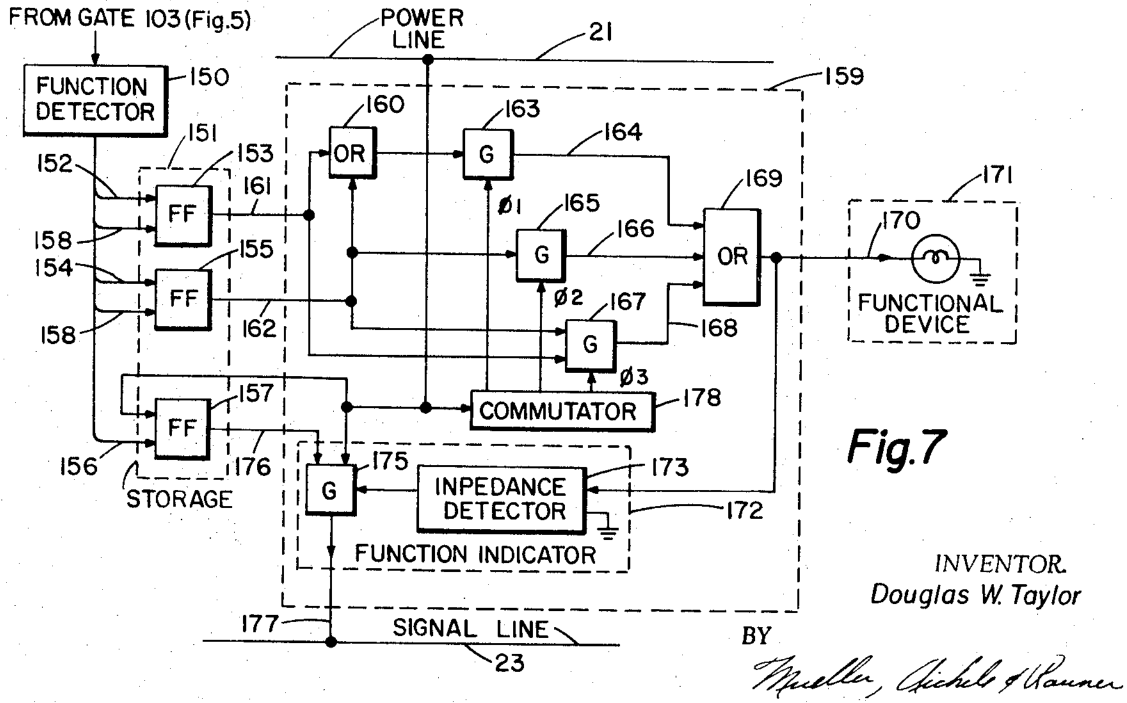
FIG. 7 is a block diagram of a multi-function-performing station usable with the FIG. 1 system.

Referring next to FIG. 7, there is shown a function performing station in block schematic form which is capable of performing several functions on a single device. The address signals on line 23 may be of the type generated by master sequencer 22 of FIG. 5 and transferred as described with respect to FIGS. 11 and 12. The signal from gate 103 (FIG. 5) is supplied to function detector 150 which may be of the type described with respect to the address detection circuits 90 and 91. A plurality of lines 152, 154, 156, 158 carry signals from detector 150 to storage means 151. Storage 151 is shown as consisting of flip-flops. When a first amplitude control signal is detected by detector 150, an actuating signal is supplied over line 152 to set flip-flop 153. A second amplitude causes a signal to be supplied over line 154 to set the flip-flop 155. Line 156 carries a signal setting flip-flop 157 to indicate that the function being performed by function device 171 is to be sensed. Reset lines 158 reset flip-flops 153 and 155 for deactivating the function performing station. Flip-flop 157 is reset by the next occurring power pulsation from line 21, that is, flip-flop 157 is set only during the negative one-half cycle following the line 156 signal.

Control circuit 159 is responsive to the signal states of flip-flops 153 and 155 to adjust the brilliance of the lamp in functional device 171. When both flip-flops are reset, the lamp is off; when flip-flop 153 only is set, the lamp is dimly lit when flip-flop 155 only is set, the lamp is moderately lit; and when both flip-flops 153 and 155 are set, the lamp is fully lit. To provide the differences in brilliance, commutator 178 generates three-phase power pulsations from power pulsation 21A supplied respectively to gates 163, 165 and 167. Those gates are selectively opened in accordance with the signal outputs of flip-flops 153 and 155 as shown in Table I.

TABLE I

| Flip-flop 153 | Flip-flop 155 | Gate 163 | Gate 165 | Gate 167 |
|---|---|---|---|---|
| Reset | Reset | Closed | Closed | Closed. |
| Set | do | Open | do | Do. |
| Reset | Set | do | Open | Do. |
| Set | Set | do | do | Open. |

Inspection of Table I shows that when flip-flop 153 only is set, one of three power pulsations 21A are supplied to the lamp; when flip-flop 155 only is set, two of every three power pulsations are supplied; and when both are set, all power pulsations 21A are supplied.

The set indicating signals of flip-flops 153 and 155 are respectively supplied over lines 161 and 162. OR circuit 160 passes both set indicating signals to open gate 163, if either flip-flop is set. Gate 165 is opened by the flip-flop 155 set indicating signal on line 162. Both lines 161 and 162 are connected to gate 167. OR circuit 169 combines the three-phase power pulsations into one train of power pulsations on line 170.

The functional or operational status of lamp 171 is provided by function indicator circuit 172. Impedance detector 173 is connected across lamp device 171. When the lamp is lit, it has a certain electrical impedance and this impedance varies in accordance with the temperature of the lamp and therefore its brilliance. Impedance detector 173 may be of known design and supplies signals through gate 175 opened by a negative one-half cycle square wave 21A supplied over line 174 and flip-flop 157 enabling signal over line 176 to supply a functional status signal over line 177 to line 23. An indicating station (not shown) may be programmed to receive the function indicating signal. As mentioned above, flip-flop 157 is set only during a negative-one-half cycle after being addressed through gate 103 and function detector 150.

Figure 8:
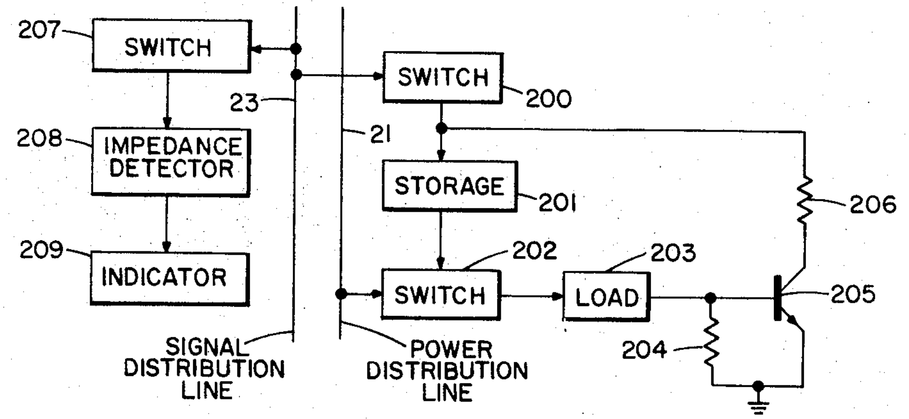
FIG. 8 is a combined block-schematic diagram of a function performance status indicating system.

Referring next to FIG. 8, a second functional device status indicator circuit is shown in block diagram form. Switch 200, constructed as switches 89 and 103 of FIG. 5, selectively connects signal line 23 to storage 201 which may be a flip-flop. Storage 201 supplies a control signal for selectively opening switch 202 which then passes power pulsations from line 21 to load 203. Switch 202 may be a gate. The current amplitude flowing through load 203 also flows through sensing resistor 204. Transistor 205 has its base and emitter electrodes connected across resistor 204. The electrical conductivity of transistor 205 is determined by the voltage drop across resistor 204 which in turn is determined by the electrical current flowing through load 203. The current amplitude is indicative of the function being performed by load 203, whatever that may be. The collector of transistor 205 is connected through current-limiting resistor 206 to switch 200. As the current through load 203 is increased, the electrical conductivity of transistor 205 is increased. Such increased conductivity is reflected to signal distribution line 23. This action occurs during a negative one-half cycle of the power pulses when no other signal is being transferred over line 23. The increased conductivity or reduced impedance is supplied through switch 207 to impedance detector 208 which may be located in the vehicular control console 35 (FIG. 1). Impedance detector 208 supplies an appropriate signal to indicator 209 for indicating to the vehicular operator the particular functional status of load 203. The internal construction of switch 207 and detector 208 may be as above referred to for similar type devices.

Figure 9:
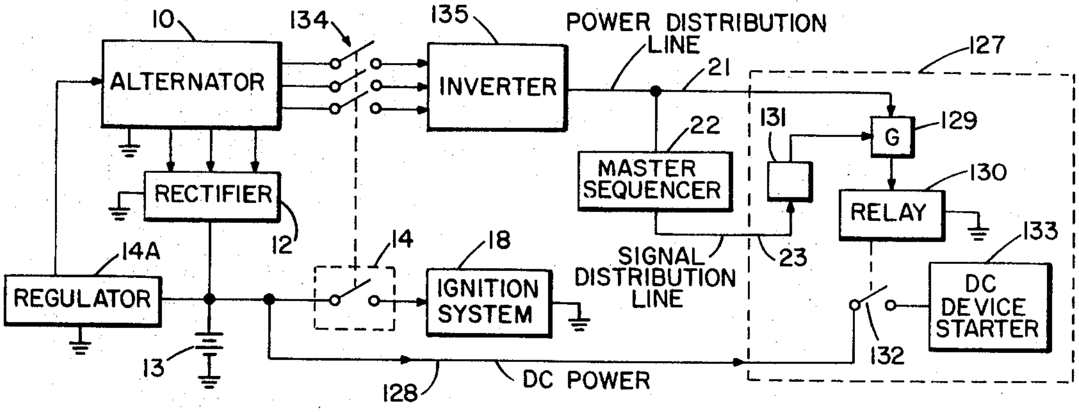
FIG. 9 is a block diagram of a modification to the FIG. 1 system.
Figure 10:
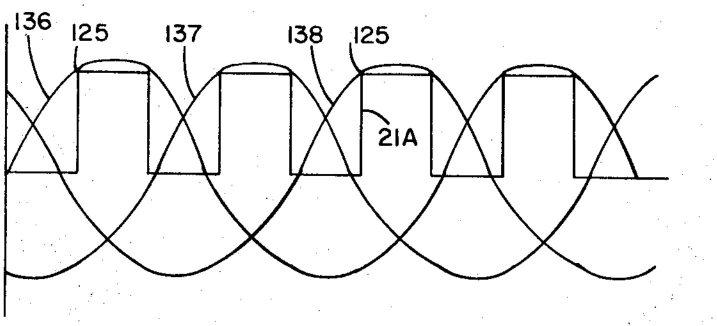
FIG. 10 is a chart showing idealized waveforms used to explain the operation of the FIG. 9 illustrated system.

Referring next to FIGS. 9 and 10, there is shown another system for providing pulsating power to a vehicular electrical system. Three-phase alternator 11 is selectively connected by three-pole single-throw switch 134, ganged to ignition switch 14, to inverter 135. Inverter 135 may be a rectangular pulse former of known design such as a transistor which switches between current saturation and nonconduction upon predetermined voltage amplitudes being applied to one of its control electrodes. Such action is described with respect to FIG. 10 wherein the three-phase alternating current signals 136, 137 and 138 of alternator 11 are shown. Inverter 135 consists of three parts, one for each of the three phases, each part providing high current conduction at point 125 on the respective three phases for supplying square waves or pulsating power waves 126 over line 21 to master sequencer 22. Rectifier 12 supplies DC power to charge battery 13 and actuate regulator 14A in a known manner. Station 127 receives pulsating power from line 21 and the signals from signal line 23 as aforedescribed.

In addition to supplying pulsating power (the frequency of which varies with motor speed) to various function performing stations in a vehicle, DC power may be selectively supplied to any of such stations, such as station 127 of FIG. 9 which is operative to start the motor. Gate circuit 129 receives pulsating power from power line 21 and selectively supplies such to activate relay 130 upon receipt of a control signal over signal line 23. It is understood that an address detection circuit and other control circuitry is electrically interposed between gate 129 and line 23 as indicated by small rectangle 131.

Relay 130 may be of a self-latching type and when activated by the gate 129 signal may hold until deactivated by other circuitry (not shown). Relay 130 is operative to close switch part 132 which connects DC power from line 128 to a DC device 133, a starter.

Figure 11:
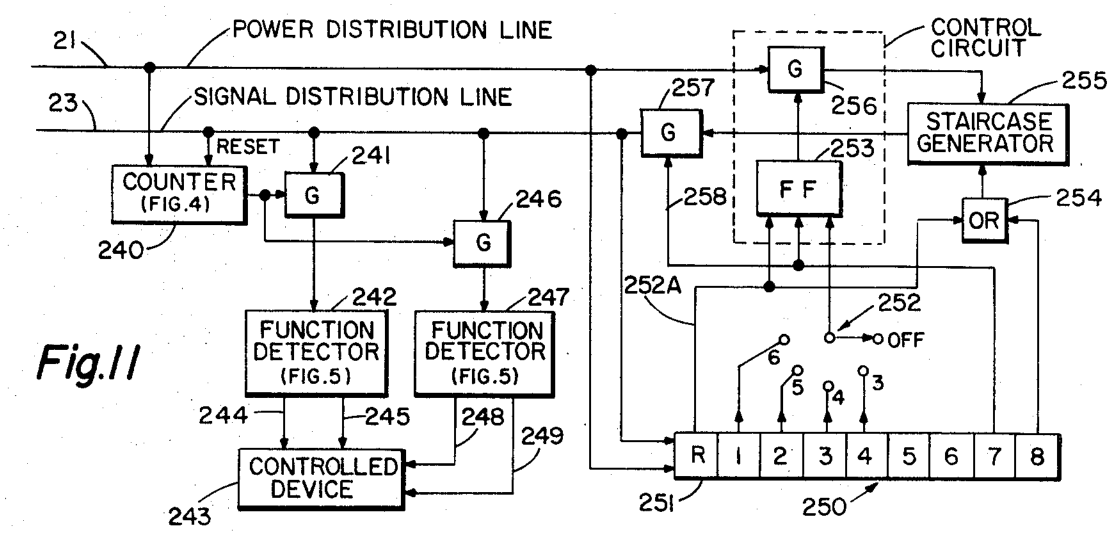
FIG. 11 is a signal flow block diagram of a function addressing system usable with the FIG. 1 illustrated system.

Refering to FIG. 11, there is illustrated in signal-flow block-diagram form a multiple-function selecting or addressing scheme usable with the FIG. 1 illustrated system. Both the function address generation and detection are shown. The function performing station counter 240, which may be constructed as illustrated in FIG. 4, upon address detection supplies a gate enabling or opening signal to gates 241 and 246. These gates respond to the enabling signal to selectively connect function detectors 242 and 247 to signal line 23 for receiving function indicating signals. In this embodiment the address signals illustrated in FIG. 6 are utilized. Function detectors 242 and 247 are constructed in the same manner as the address detection, control circuits and gates of stations 26 and 27 in FIG. 5. Function detector 242 is responsive to the third occurring address signal 71 (FIG. 6) to emit a control signal over line 244 to device 243 for performing a first function, for example, energizing the right rear tail light. When the fourth occurring function address signal 71 is received by detector 242 a control signal is supplied over line 245 to extinguish the right rear tail light. Function detector 247 is responsive to the fifth occurring address signal 71 to supply a control signal over line 248 for effecting flashing of the right rear tail light in device 243. The flashing may be effected in a usual manner. Upon receipt of the sixth occurring address signal 71 function detector 247 supplies a control signal over line 249 to extinguish the flashing. Controlled device 243 may be connected to power line 21 or to a DC source and may contain integrated circuit timing devices and switches for controlling the right rear tail light. The method of controlling the light is not important to the practice of the present invention and will not be discussed.

In selecting functions to be performed with the FIG. 6 illustrated addressing signals there is provided a system for generating such signals such that any one of the seven address signals 71 may occur during any selected negative one-half cycles of the pulsating power for initiating the function to be performed. It will be remembered that gates 241 and 246 are opened only during the negative one-half cycle of the pulsating power following the detection of the station address by counter 240. Such a function selecting signal generating system includes manually operated switch 252 located in the operator's console 35. Counter 250 (constructed as the FIG. 4 illustrated counter) controls the function address generating system both as to the generation and supplying the function selecting signal. Counter 250 is first reset by reset circuit 251 upon detection of the fiducial signal, such as described for the FIG. 4 illustrated counter. The counter 250 output lines connected to terminals 3–6 of switch 252 are from the respective counter stages indicated by the numbered boxes 1, 2, 3, and 4 corresponding to the pulse lines 53, 56, 62 and 60 of FIG. 4. The counter 250 output pulses are respectively supplied to switch 252 terminals labeled 6, 5, 4 and 3 to selectively connect the 250 stages to the set input of flip-flop 253. Flip-flop 253 when set enables gate 256 to pass positive power line pulsations to staircase generator 255, constructed as illustrated in FIG. 5.

When the sixth occurring address pulse is desired to be emitted by generator 255 through gate 257 to signal line 23 during the selected address period 7, flip-flop 253 is set six pulsating power cycles prior to the seventh occurring power line pulsation. Correspondingly, when the fifth occurring address signal of FIG. 6 is desired to be emitted during the negative one-half cycle of period 7, the flip-flop 253 is set five periods prior to period 7. Therefore gate 256 selectively passes 3, 4, 5 or 6 pulsations from power line 21 immediately prior to the seventh occurring pulsation such that staircase generator 255 will supply an address signal of selected amplitude over line 23 during a predetermined negative half-cycle.

Figure 12:
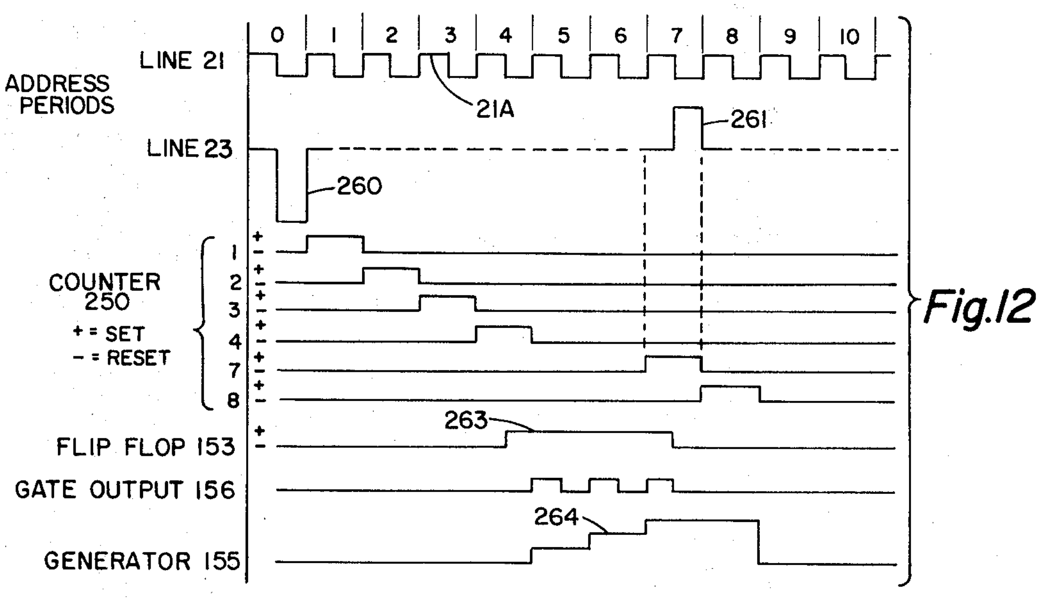
FIG. 12 shows idealized waveforms used to explain operation of the FIG. 11 illustrated function addressing system.

Referring to FIG. 12 power line 21 pulsations 21A corresponding to the address periods are shown. Line 23 has signal 260 corresponding to the fiducial signal. Address signal 261 is emitted over line 23 and has the amplitude of the third occurring address signal on FIG. 6. Flip-flop 253 is initially reset. At time 263 (midpoint of clock period 4) flip-flop 253 is set by a pulse from counter 250 stage No. 4 as passed through manual switch 252. Flip-flop 253 being set, opens gate 256 to pass positive pulsations in address periods 5, 6 and 7 from line 21 to staircase generator 255. At the midpoint of address period 7, the seventh stage of counter 250 emits a signal over line 258 resetting flip-flop 253 and opening gate 257 to pass the function indicating signal 261.

Counter 250 serves the dual purose of actuating and controlling staircase generator 255 in accordance with the manual selection of switch 252 and addresses the control station for opening gate 257. Gate 257 may be the type of gate referred to previously in this description. Counter 250 has an eighth stage which supplies the signal to OR circuit 254 for resetting staircase generator 255. Reset circuit 251 supplies its reset signal over line 252A to reset flip-flop 253 to insure that staircase generator does not prematurely start a generation of function indicating signals. Line 252A also connects reset circuit 251 through OR circuit 254 to staircase generator 255. OR circuit 254 is connected to the gate electrode of staircase generator discharge circuit 81 (FIG. 5). For example, OR circuit 254 may be connected between Zener diode 82 and the gate electrode of SCR 83. This connection provides two means of discharging staircase generator 255, one being the addressed discharge by the eighth stage of counter 250 and the other being determined by the reverse voltage of Zener diode 83.

Referring again to FIG. 12, generator 255 supplies the staircase waveform 264 on capacitor 75 (FIG. 5). The first amplitude staircase is provided during the fifth pulsating power cycle following the fiducial signal, the second level during the sixth and the third level during the seventh cycle. During the seventh period negative one-half cycle the third level address signal amplitude is supplied as previously described. During the eighth period the staircase generator 255 is discharged enabling it to be used for subsequent function addressing. By judicious selection of the address of various function performing stations, the same staircase generator 255 may be used to generate function indicating signals for a plurality of control stations.

When a single period, such as period 7, is used to exchange control signals for a plurality of functions, it is necessary to accommodate simultaneous selection of two different functions. Either a function priority network, a scanning device or the like may be utilized to prevent attempted concurrent actuation of two different functions. Such selective systems are known and will not be discussed. An inherent priority system is found in the FIG. 11 illustrated system. Such priority permits selection of one function, such as turn on brake lights, to the exclusion of a second function, turn on head lamps, for example, so long as the one function is being selected. Assume that switch 152 is constructed such that all terminals 3, 4, 5 and 6 may be simultaneously connected to the set input of flip-flop 253. The terminal 6 connection passes a signal from counter 251 to set flip-flop 253 before any other terminal passes a signal. Signals applied to the flip-flop 253 is set input after being set have no effect, thereby excluding selection of any function by signals passed through terminals 3, 4, or 5. Therefore, terminal 6 is selected to pass signals for turning the brake lights on, such lights being the most crucial in an automotive vehicle. It is to be understood that additional or other arrangements may be provided to handle priority of function.

From the above descriptions, it is seen that in practicing the present invention there are many variations and modifications which can be made to a particular vehicular electrical system and still come within the full scope of the invention presented herein.

What is claimed is:

1. A vehicular power distribution and control system, including the combination, a power source supplying pulsating power having repetitive power pulsations, a plurality of stations to be selectively actuated, said stations being arranged in sets, all stations in a given set having identical system addresses, each station including a control circuit and a device, said source and stations being connected to a common reference potential, a power distribution line disposed substantially coextensively with the system and receiving pulsating power from said source and being connected to all said stations, a signal distribution line disposed substantially coextensively with said power distribution line, master sequencing means receiving said pulsating power and supplying a fiducial signal to said signal distribution line, address signal means at each station for receiving and being responsive to said fiducial signal for establishing a reference state therein and further including means for selecting one pulsation of said pulsating power, said one pulsation being a different pulsation for each set of stations, and each address signal means being further responsive to the respective said selected one pulsation to complete a signal path between the respective station device and said signal distribution line, a first station in each set operative when connected to said signal distribution line to emit a control signal to said signal distribution line during said one pulsation, a second or function performing station in each set being responsive respectively to said one pulsation to receive said control signal emitted by said first station, respectively, and responsive to said received signal to perform a function indicated thereby.

2. The system of claim 1 wherein said pulsating power has first and second power levels, said stations in a given set being responsive to said pulsating power to detect an address during said second level and each said first station in the respective sets emitting said control signal only during the first occurring first power level subsequent to occurrence of said second power level at which addressed detection occurred.

3. The system of claim 2 wherein said master sequencing means supplies successive sets of address signals to said signal line in response to said pulsating power, said master sequencing means operative to supply a different shaped one of said address signals in each set to serve as a fiducial signal for said sets of address signals, respectively, and said address signal responsive means being respectively responsive to another one of said signals to select said one pulsation of said pulsating power.

4. The system of claim 2 further including address detection means in said master sequencing means responsive to a predetermined one of said address signals to establish a first impedance state, said master sequencing means responsive to said first impedance state to generate an address signal having a leading edge of greater duration than address signals generated in the absence of said first impedance state.

5. The system of claim 4 wherein said address detection means maintains said first impedance state not greater than one cycle of pulsating power.

6. The system of claim 1 wherein said master sequencing means includes counting means responsive to a first predetermined number of power pulsations to emit said fiducial signal to said signal distribution line, each address signal responsive means being responsive to second respective predetermined numbers of the power pulsations subsequent to said fiducial signal to select said respective one pulsation, and said first predetermined number of power pulsations being greater than any one of said second respective numbers of pulsations.

7. The system of claim 6 wherein said counting means comprises a counter responsive to said pulsating power to continuously count power pulsations and a pulse generator actuated by said counter whenever said counter counts to a predetermined counter state indicative of said first predetermined number of power pulsations, each of said address signal responsive means comprise a counter responsive to receiving said second respective predetermined numbers of power pulsations subsequent to each fiducial signal to selectively emit a gate enabling signal, and gate means at each station respectively responsive to the gate enabling signal to selectively complete said signal path between said signal distribution line and the respective station, and said first stations having control signal generating means connected to said gate means for emitting control signals to the signal distribution line.

8. The system of claim 7 wherein said counters are ring counters, said counting means in said master sequencing means having a number of counter stages indicating the number of different station addresses in the system, sets of said address signal responsive means with counters each having an identical number of counter stages, the number of sets corresponding to the number of different station addresses, and reset means in each address signal responsive means to set a first counter stage to an active condition in response to each fiducial signal, each said address signal responsive means counter responsive to said power pulsations to set successive ones of such counter stages to said active condition with the last stage set to said active condition supplying said gate enabling signal and the next succeeding power pulsation resetting said last counter stage.

9. The system of claim 8 wherein one set of stations comprises one control signal generating station and one function performing station having a plurality of individual portions all identically responsive to a control signal from said one control station to perform a portion of the function selected and with each function performing station portion being physically spaced apart in the system.

10. The system of claim 7 further including plural function performing station each having a counter respectively responsive to an identical number of pulsating power pulsations subsequent to each fiducial signal to emit a second gate enabling signal, gate means in each said function performing stations responsive to each respective second gate enabling signal to receive said control signal from said signal distribution line, and means in each of said function performing stations responsive to the received control signal to perform a function indicated thereby, the functions performed by each function performing station being different.

11. The system of claim 1 further including a vehicular console having a plurality of console stations, some of said console stations being control stations and others being indicator function performing stations, at least one of said control stations including manually actuated means for generating control signals to be emitted over said signal distribution line and said indicator function performing stations being operative to receive control signals from said signal distribution line and responsive to such received control signals to effect a visual indication on said console, and function performing stations disposed throughout said vehicle responsive to said control stations in said console for performing said manually actuated means selected functions.

12. The system of claim 11 wherein one of said function performing stations has a plurality of second station portions disposed in said vehicle each responsive to one of said console control station emitted control signals to perform a function indicated by said emitted control signal, and said one console control station being responsive to said manually actuated means to emit said emitted control signal.

13. The system of claim 1 wherein one of said second stations has a plurality of portions performing the same function on devices spaced apart in the system with all of said portions being identically responsive to a particular received control signal.

14. The system of claim 13 further including a plurality of function performing second stations each having a station portion at one physical location in said vehicle, each portion being individually responsive to control signals from different control stations, for performing the same function.

15. The system of claim 14 wherein said address signal responsive means for said plurality of station portions at said one physical location share common address determining means responsive to respective address signals for actuating the respective station portions, and each control signal on said signal line for said plural station portions comprises a signal capable of assuming one of a plurality of signal states with each state indicating a different function to be performed.

16. The system of claim 15 wherein a single function performinbg device is severally responsive to said station portions at said one location to perform the same function.

17. The system of claim 16 further including flip-flop memory means at said one location responsive to said control signals to individually store indicia thereof, and means at said one location responsive to said indicia to actuate said functional device.

18. The system of claim 1 wherein said pulsating power is a rectangular wave having time successive cycles having positive and negative one-half cycles in each cycle, said stations being responsive to one of said one-half cycles as an address signal and to the other of said one-half cycles to selectively send or receive a control signal in accordance with the number of said one of said one-half cycles after said fiducial signal.

19. The system of claim 1 further including direct current power distribution means and means at one of said second stations selectively receiving said DC power in joint response to said pulsating power and one of said control signals, and DC means in said one second station utilizing said DC power to perform a function in accordance with said one control signal.

20. The system of claim 1 wherein said function performing stations each have memory means storing an indication of received control signals and supplying a continuous actuating signal for effecting a continuity of function performance by an associated device intermediate reception of successive control signals.

21. The system of claim 1 wherein said vehicle has a variable speed motor and said power source in said vehicle includes a motor driven alternator supplying AC power means to rectify said AC power, and means generating said pulsating power from said rectified AC power.

22. The system of claim 21 wherein one of said function performing stations includes a device for performing a function on said motor.

23. The system of claim 22 wherein said device in said one function performing station includes means for selectively connecting said DC power to said device.

24. The system of claim 1 wherein a predetermined set of said stations which are responsive to said fiducial signal to perform a function other than establishing a reference state and one station in said predetermined set is operative to emit a control signal in the time interval immediately following said fiducial signal, and a function performing station in said predetermined set jointly responsive to receiving said fiducial signal and a control signal immediately following said fiducial signal to perform a function other than establishing a reference state.

25. The system of claim 1 wherein one of said function performing stations further includes gate means responsive to address signal responsive means at said one station to selectively connect said one station to said signal distribution line, an electro-responsive variable-impedance means connected to said gate means in said one station for varying the impedance of said signal line when said gate means is open in accordance with the performance of a device at such station, and such device and said variable-impedance means being operatively connected together.

26. The system of claim 25 wherein said electro-responsive variable-impedance means is connected across said device in said one station for detecting the electrical impedance thereof.

27. The system of claim 25 wherein said electro-responsive variable-impedance means includes a current responsive portion in series electrical circuit with said device for receiving at least a portion of electrical current flowing through said device and responsive to said current flow to alter its electrical impedance in accordance therewith.

28. The system of claim 25 further including performance indication means in said console connected to said signal line and responsive to said variable-impedance means provided impedance for indicating the quality of performance of said device in said one station, and the address signal responsive means selectively connecting said performance indication means to said signal line only when said gate means is open.

29. The system of claim 28 wherein said indicating means and said variable-impedance means are selectively connected together by said address signal responsive means in the respective stations and control signals from one of the stations to the other stations being transmitted over said signal line when said quality indication impedance is being provided thereover.

30. The system of claim 1 wherein said master sequencer is operative to supply sets of address signals which are spaced apart in time with each address signal in each set having a different amplitude, sets of said stations being responsive to different ones of said address signals to exchange signals in the time space immediately following the respective different ones of said address signals.

31. The system of claim 30 wherein said pulsating power is supplied to each of said stations, each station address responsive means including a voltage comparator for comparing the amplitude of said pulsating power and a predetermined portion of the amplitude of the received address signal on said signal line and jointly responsive to the pulsating power and to said address signals when the predetermined portions of said amplitudes are identical to effect an electrical connection between the signal line and said station for a time interval between the compared address signal and the next succeeding address signal.

32. The system of claim 30 wherein one of said address signals has a longer leading edge than any other of said address signals and means responsive to such leading edge in one of said stations for effecting a function in accordance therewith.

33. The system of claim 1 wherein said address signal responsive means in said first and second stations responsive to a predetermined number of power pulsations subsequent to each fiducial signal to connect said first and second stations to said signal line;

said first station having function control signal generating means emitting a signal to said signal line when addressed indicative of one of a plurality of functions to be performed, and function detecting means at said second station to detect said emitted signal when addressed and further means in said second station responsive to said emitted signal being detected to supply an actuating signal in accordance therewith.

34. The system of claim 33 wherein said function control signal generator emitted control signal has one of a plurality of unique voltage amplitudes, some of said voltages amplitudes being greater than the voltage amplitude of said power pulsations, said function detecting means including voltage comparison means receiving said power pulsations and predetermined portions of said emitted signal, said comparison means having one comparator for each function to be detected, said comparators responsive to detection of coincidence in voltage amplitudes of said pulsating power and said predetermined portions to supply a unique function detected signal, and said further means responsive to said function detected signals to supply an actuating signal in accordance therewith.

35. The system of claim 33 wherein said further means includes a commutator receiving said power pulsations and supplying a succession of power pulsations on a plurality of different power-phase lines, a power gate connected to each of said power-phase lines, memory means storing said actuating signals and supplying indications of said stored signals for opening said gates in accordance with said stored actuating signals for passing predetermined ones of said succession of power pulsations, and means combining said passed power pulsations and supplying same to a device for effecting different power levels in the device.

36. The system of claim 6 having a device with plural function performing portions in one of said second stations, said one of said second stations being responsive to a control signal from said first station in the same set of stations to supply pulsating power from said power distribution line to said device for actuating said device to perform a function.

37. The system of claim 36 wherein said device operates solely on said pulsating power selectively supplied from said power distribution line.

38. The system of claim 36 further including a DC power supply means, the improvement further including in combination switching means in said second station responsive to said pulsating power to complete a power supply circuit path from said DC power supply means to said function performing portion.

References Cited

UNITED STATES PATENTS

| | | | |
|---|---|---|---|
| 2,955,278 | 10/1960 | Sibley | 340—168X |
| 3,244,805 | 4/1966 | Evans | 340—163X |
| 3,384,874 | 5/1968 | Morley et al. | 340—163 |
| 3,400,219 | 9/1968 | Jahns et al. | 340—169X |

ROBERT K. SCHAEFER, Primary Examiner

T. B. JOIKE, Assistant Examiner

U.S. Cl. X.R.

307—140; 340—168, 169